…

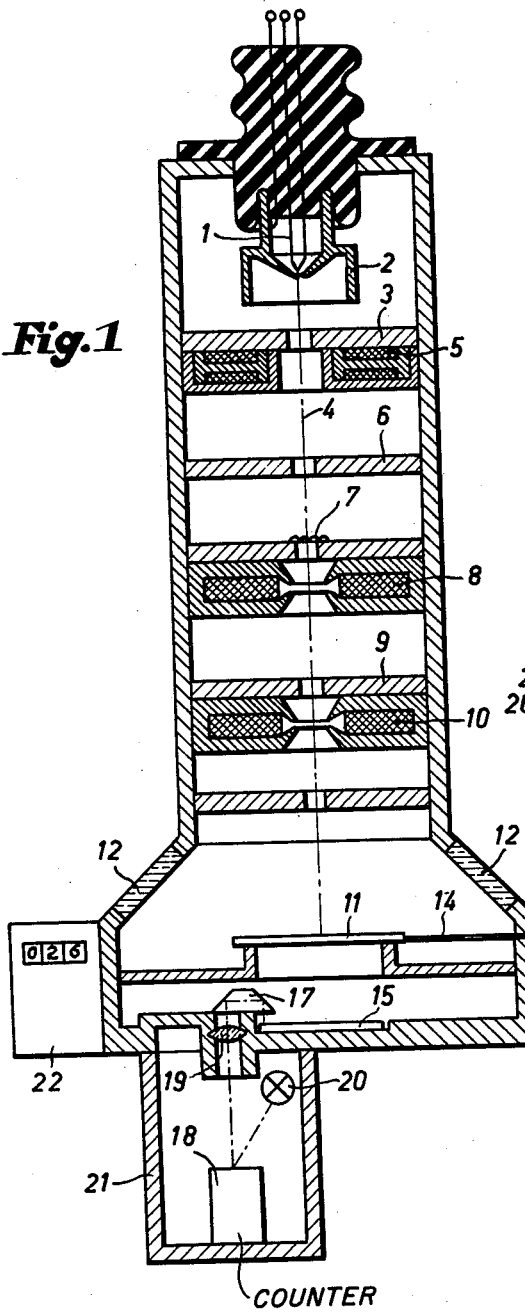
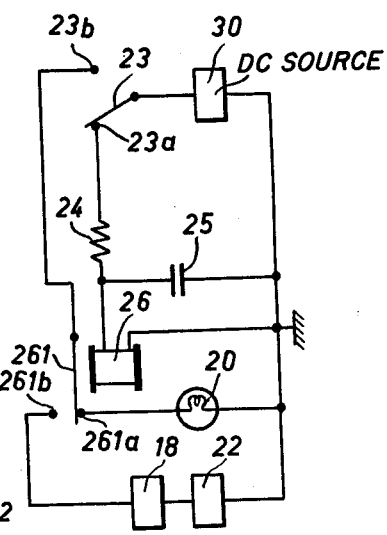

3,105,904
METHOD AND APPARATUS FOR THE MARKING FOR IDENTIFICATION OF THE PHOTOGRAPHS IN CHARGE CARRIER BEAM APPARATUS
Ernst Gütter and Helmut Querchfeld, Oberkochen, Wurttemberg, Germany, assignors to Carl Zeiss, Wurttemberg, Germany
Filed May 1, 1962, Ser. No. 191,474
Claims priority, application Germany May 12, 1961
3 Claims. (Cl. 250—67)

This invention relates to electron microscopes and, more particularly, to a film index marking system therefor.

During investigations of objects by means of a charge-carrier beam instrument, for instance, an electron microscope, several photographs are normally made. In order to avoid mixing the photographs up, it is necessary to mark the individual photographs for identification. For this purpose the film can, after each exposure, be removed from the vacuum chamber and be marked, for instance, by numbering with lead pencil or photographic recorder. It is also possible to transport the film material in the vacuum chamber from a storage container after the exposure into a second storage container and to remove the exposed film material only after the instrument, or a part thereof, has been opened to the air.

In all of these cases, the possibility of applying an erroneous index marking to a frame exists. Furthermore, such marking is expensive and time-consuming.

These disadvantages are avoided by the method in accordance with the present invention. This method serves to mark each film frame with an index mark derived from a counter. The counter is automatically advanced a digit as each frame is exposed, thereby to prevent error in indexing. It is preferable to mark the frame with the index by projecting the counter reading on the film.

The apparatus in accordance with the invention accordingly contains optical means for projecting a counter reading onto the edge of the film material. A lamp serves to illuminate the counter at the start of exposure of each film frame. Thus, with this apparatus, upon making each picture, the corresponding indication of a counter is automatically recorded on the edge of the film.

The photographed counter is synchronously connected with a second counter which is at all times visible to the observer. The observer can, therefore, at any time note the characteristic data of the specific picture and designate this picture by the reading of the counter. After the development of the film material, the photograph corresponding to the note in question can be readily found, since this photograph bears on its edge the same counter number as the note made by the observer.

It is advisable to provide an electronic time member which, upon the introduction of the charge-carrier beam exposure, connects for a very short time the lamps serving to illuminate the counter. In this way assurance is had that regardless of the duration of the charge-carrier beam exposure, a constant quantity of light is always available for the photographing of the identifying designation.

The counters are advantageously advanced by a switch actuated upon the completion of each charge-carrier beam exposure. In this way assurance is had that the two counters are automatically advanced after each photograph.

The invention will be described in further detail below with reference to a preferred embodiment shown in the accompanying drawing, of which FIG. 1 is a cross sectioned view of an electron microscope provided with a new device for marking the film material.

FIG. 2 is a schematic diagram of the circuit of the device for marking the film material.

In FIG. 1, there is shown an electron microscope in accordance with the present invention, which comprises a cathode 1, modulator electrode 2 and anode 3 of the electron beam generating system. The electron beam produced by this beam generating system is designated 4. Below the anode 3, there is positioned an electromagnetic deflection system 5 to adjustably deflect the electron beam 4.

The electron beam 4 passes through a diaphragm 6 which establishes the maximum illumination aperture and strikes the object 7 to be observed. By means of an objective lens 8, another diaphragm 9 and a projection lens 10, an image of the object 7 is produced on the fluorescent screen 11. This fluorescent screen can be observed through the window 12.

The fluorescent screen 11 can be swung around a shaft 14 by the knob 13. Below the fluorescent screen 11, there is arranged a photographic plate 15, suitable for the making of photographic pictures by means of the electrons.

Above the edge of the photographic plate 15 there is arranged a prism 17 by means of which the image of the reading of the counter 18 is projected onto the photographic plate. A lens 19, which hermetically seals the high vacuum space, serves to project the reading of the counter onto the photographic plate.

The counter 18 is located, together with a lamp 20 in a light-tight enclosure 21. Therefore, an image of the reading of the counter 18 on the edge of the photographic plate 15 can be produced only when the lamp 20 illuminates the counter 18.

Another counter 22, which is connected synchronously with the counter 18, is mounted for convenient observation by the observer.

The circuit for actuating the lamp 20 in response to film exposure is shown in FIG. 2. In the rest position shown in FIG. 2 the fluorescent screen 11 blocks exposure of the film 15. Switch 23, which is coupled to the actuating member for the fluorescent screen, contacts terminal 23a. The D.C. source 30 sets up a current flowing through charging resistor 24 and the relay 26. The relay 26 is closed and holds the switch 261 in contact with terminal 261a. At the same time the capacitor 25 is charged via the resistor 24.

When the fluorescent screen 11 is swung up in order to make a photograph, the switch 23 is thereby moved to contact terminal 23b. A current now flows via the switches 23 and 261 through lamp 20 which burns until the capacitor 25 has discharged through the relay 26, and the relay 26 has dropped out. At this time, switch 261 is brought into contact with terminal 261b and current flows through switch 23, switch 261, and the two counters 18 and 22, which are connected in series. After the photograph has been taken, the fluorescent screen 11 is again swung in and the switch 23 returns into the rest position shown in FIG. 2. In this way current through the counters 18 and 22 stops and the counters are advanced by one digit.

Upon the lighting of the lamp 20, an image of the reading of the counter 18 is projected onto the photographic plate 15 by the lens 19 and the reflecting prism 17. The photographic plate, therefore, after development, shows on its edge the same number as shown by the counter 22 when the photograph was made.

It is also possible to replace the incandescent bulb 20 by an electronic flash bulb and to design the circuit in such a manner that when the fluorescent screen 11 is swung up, an electronic flash is produced.

This invention may be variously embodied and modified within the scope of the subjoined claims.

What is claimed is:

1. A film index marking system for use with an electron beam apparatus in which the beam impinges upon a film for exposure thereof, comprising a fluorescent screen shielding said film from exposure, means for swinging said screen out of said shielding position to expose said film, a first counter, means for illuminating said first counter simultaneously with movement of said screen out of the shielding position, an optical system including a reflecting prism to focus an image of said illuminated counter on the edge of said film, and means for advancing the counter one digit on return of said screen to the shielding position.

2. A film index marking system in accordance with claim 1 in which said means for illuminating said first counter comprises a lamp and a timer to energize said lamp during a fixed time interval after said fluorescent screen has been swung out of the shielding position.

3. A film index marking system in accordance with claim 1 which includes a second counter synchronously indexed with said first counter.

References Cited in the file of this patent

UNITED STATES PATENTS

| | | |
|---|---|---|
| 2,356,963 | Young | Aug. 29, 1944 |
| 2,433,129 | Land | Dec. 23, 1947 |
| 2,773,436 | Martin | Dec. 11, 1956 |